Sept. 28, 1937.     J. E. CADY     2,094,347
CONNECTION
Filed Nov. 29, 1935

INVENTOR.
JOHN E. CADY
BY
ATTORNEY.

Patented Sept. 28, 1937

2,094,347

UNITED STATES PATENT OFFICE 2,094,347

CONNECTION

John E. Cady, Indianapolis, Ind., assignor to United States Rubber Products, Inc., New York, N. Y., a corporation of Delaware Application November 29, 1935, Serial No. 52,163

1 Claim. (Cl. 248—75)

This invention relates to connections, and specifically it relates to a method and means for forming a connection between a supply of compressed fluid and the valve stem of an inner tube during the vulcanization of the latter.

In general, the invention comprises a fitting in the form of a nozzle connected to a conduit for supplying fluid under compression, and having a tapered seat for cooperable engagement with the conventional internal tapered seat in a valve stem, and means for positioning the nozzle in a definite location relative to the valve stem whereby the introduction of fluid into the inner tube operates to move the valve stem axially toward the nozzle to effectuate a seal therebetween.

In the vulcanization of inner tubes it is essential to inflate the tubes while in the vulcanizing mold. It is also necessary that the tube be in an inflated state throughout the period of vulcanization. To attain this condition, an operator at the beginning of the vulcanizing operation connects the valve stem of the inner tube with a source of fluid under compression. Also, the operator must detach this connection when the vulcanizing operation is completed.

Where large numbers of tubes are vulcanized, the attachment and detachment of fluid means with the inner tube is an operation which has heretofore required a considerable amount of time and accuracy in assuring a non-leaking connection between the valve stem and the compressed fluid supply means. Prior to my invention, connecting means for this purpose have been utilized in which flexible gasket material was used in association with the end of the valve stem for effecting a seal.

Various means have been utilized for maintaining the gasket in tight engagement with the end of the valve stem. Such means included additional means for engagement with the exterior threads of the valve stem. Therefore, the effectiveness of the connection has heretofore been dependent entirely upon the skill of the operator. Furthermore, due to the deterioration of the gasket material, it frequently occurred that the connection would permit fluid to leak during the vulcanization of the inner tube. As the connections were usually in the form of a cap positioned exteriorly of the valve stem, any leakage of the connection was directed along the valve stem and against that portion of the vulcanizing mold which surrounds the valve stem. As a result, certain portions of the tube or mold were cooled, thus preventing complete vulcanization of the tube at such locations.

A further objectionable feature of the conventional types of connecting means results in view of injuries sustained to the external threads of the valve stem due to the utilization of such threads as a means for securing the gasket in tight engagement with the end of the valve stem.

In my invention the connecting means in no way engages with the external threads of the valve stem. Furthermore, the fact that the nozzle is positioned interiorly of the stem overcomes any possibility of causing a blast of air to be directed against the inner tube or its associated parts in the event leakage should occur. Also, it is not necessary for the operator to make a tight engagement between the nozzle and the valve stem, for as soon as the inner tube is inflated it operates to move the valve stem axially toward the nozzle, thus automatically producing a tight seal.

Besides the advantages herein described, the device of my invention provides a quick attachable and detachable means of forming a connection, coupled with simplicity in function and economy in manufacture. These and other objects and advantages will appear more obvious in the following detailed description when considered in connection with the accompanying drawing, in which:—

Figure 1:
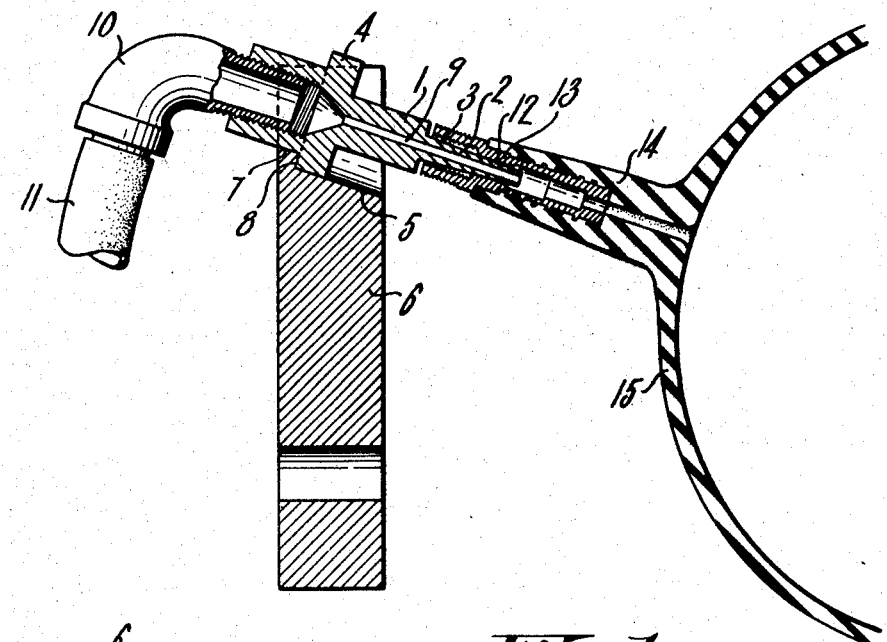
Fig. 1 is a transverse view in section of an embodiment of my invention, shown in engagement with a valve stem and inner tube.
Figure 2:
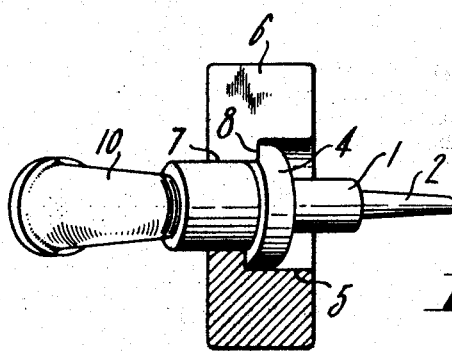
Fig. 2 is a plan view, partly in section, of the connecting device shown in Fig. 1.

Referring to Fig. 1, the connecting means comprises a nozzle body 1 having extending therefrom a nozzle 2 including a long, tapered seat 3 on the exterior surface thereof. A flange 4 extending from the body 1 is adapted for resting in a slot 5 within a bracket 6. A reduced portion 7 of the slot 5 provides a shoulder 8 which engages with the flange 4 and limits the backward movement of the nozzle body 1. An aperture 9 passes through the nozzle 2 and body 1, and communicates with an elbow 10 joined to a flexible conduit 11. The conduit 11 in turn connects with suitable valve means (not shown) and to a source of fluid under pressure.

In assembly with the valve stem of an inner tube the nozzle 2 engages with a seat 12 internally of a valve stem insert 13. This seat 12 is present in all conventional valve stems wherein it operates as a seat in combination with conventional valve insides or mechanisms.

The valve insert is shown in combination with a rubber stem 14 attached to an inner tube 15. However, it is to be understood that the valve stem may be of the all-metal type, or of any combination of rubber and metal. It is preferred, however, that the stem be composed of rubber, at least in part, as such rubber operates as resilient means interposed between the seat formed by the nozzle 2 and insert 13 and the inner tube.

Figure 3:
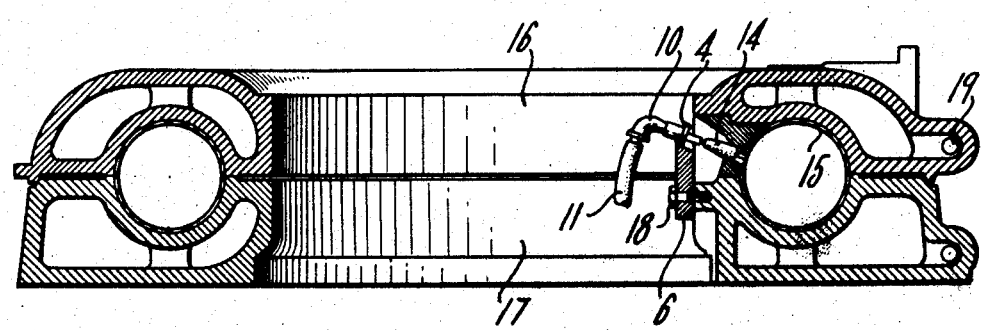
Fig. 3 is a transverse view in section of an assembly of the connecting means, showing its relative position with a vulcanizing mold.

In Fig. 3 is illustrated a conventional vulcanizer unit comprising upper and lower mold sections 16 and 17, respectively. The bracket 6, by means of a bolt 18, is secured to the lower mold section 17 in such manner that the valve stem and nozzle connecting means are in axial alignment.

In the assembly operation the vulcanizing unit is opened by swinging the upper mold section 16 on its pivot 19. An inner tube 15 is placed in the annular depression formed in the lower mold section 17 in such manner that the valve stem 14 extends partially therefrom. At this stage of the operation the operator grasps the nozzle body 1 and inserts the nozzle 2 within the insert 13 of the valve stem.

A flange 4 on the nozzle body 1 is limited only in outward axial movement by the shoulder 8. Therefore, any variance in the proper position of the valve stem due to the deflated condition of the tube may be compensated for by a free axial movement of the nozzle body 1 toward the valve stem.

After such connection is made the operator causes the upper mold section 16 to lower in contact engagement with the lower mold section. As customary with conventional vulcanizing units the mold sections are locked together, and the relative movement of the mold sections is utilized to operate means (not shown) for controlling a valve to permit the flow of compressed fluid through the nozzle aperture 9 and into the interior of the inner tube 15.

During the inflation of the inner tube the walls thereof expand and engage in contact relation with the cavity surface of the mold. This expansion of the inner tube moves the valve stem 14 outwardly, carrying with it the nozzle 1 until the flange 4 engages with the shoulder 8 of the bracket 6.

The tapered surface 3 of the nozzle 2 and the tapered seat 12 of the insert 13 operate in part to restrict the complete outward movement of the valve stem 14. Consequently, the internal pressure within the inner tube 15 reacts with sufficient force against the valve stem 14 to maintain a positive seal between the insert 13 and the nozzle 2.

After vulcanization of the inner tube a valve mechanism (not shown) is operated, which relieves the pressure within the inner tube. The mold section 16 is pivoted upwardly and the inner tube 15 is removed from the cavity of the lower mold section 17.

In removing the inner tube the operator grasps the valve stem 14 and moves it axially away from the nozzle 1. This operation requires little or no extra work on the part of the operator, and results in completely disconnecting the valve stem from the means connected to the source of compressed fluid.

After removal of the inner tube, another inner tube is inserted and engaged with the connecting means in a similar cycle of operation.

While I have shown and described a certain preferred embodiment of my invention, it is to be understood that other modifications may be made within the spirit of the invention and the scope of the appended claim.

Having thus described my invention, what I claim and desire to protect by Letters Patent is:—

Inflating mechanism comprising a support terminating in a slotted head, said slot having a shoulder formed therein whereby the slot is of greater dimensions at one side of the support than at the other, and a nozzle shaped to readily enter said slot and having a shoulder for cooperation with the slot shoulder to resist longitudinal movement of the nozzle in at least one direction.

JOHN E. CADY.